United States Patent
Hagerman et al.

(10) Patent No.: US 6,301,238 B1
(45) Date of Patent: *Oct. 9, 2001

(54) DIRECTIONAL-BEAM GENERATIVE APPARATUS AND ASSOCIATED METHOD

(75) Inventors: Bo Hagerman, Stockholm; Ulf Forssén, Saltsjö-Boo; Thomas Östman, Spånga; Hans Mähler, Onsala, all of (SE)

(73) Assignee: Telefonaktiebolaget LM Ericsson (Publ) (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/787,758

(22) Filed: Jan. 28, 1997

(51) Int. Cl.[7] ............... H04J 3/00; H04B 7/10; H04B 1/38; H04Q 7/20
(52) U.S. Cl. ............ 370/336; 370/345; 455/562; 455/450; 375/347
(58) Field of Search .................... 370/337, 347, 370/336, 345; 342/368, 373, 372, 154, 155; 455/277.1, 450, 452, 562, 509, 456, 436, 437, 440, 443; 1/1; 380/23; 701/213; 375/347

(56) References Cited

U.S. PATENT DOCUMENTS

| | | | |
|---|---|---|---|
| 4,232,197 | 11/1980 | Acampora et al. | 370/97 |
| 5,237,612 | * 8/1993 | Raith | 380/23 |
| 5,303,240 | 4/1994 | Borras et al. | 370/95.3 |
| 5,396,496 | 3/1995 | Ito et al. | 370/50 |
| 5,428,818 | * 6/1995 | Meidan et al. | 455/450 X |
| 5,437,054 | 7/1995 | Rappaport et al. | 455/33.1 |
| 5,450,329 | * 9/1995 | Tanner | 701/213 |
| 5,493,712 | 2/1996 | Ramesh et al. | 455/234.2 |
| 5,515,378 | 5/1996 | Roy, III et al. | 370/95.1 |
| 5,566,209 | 10/1996 | Forssén et al. | 375/262 |
| 5,576,717 | * 11/1996 | Searle et al. | 342/373 |
| 5,590,399 | * 12/1996 | Matsumoto et al. | 455/450 X |
| 5,596,333 | 1/1997 | Bruckert | 342/457 |
| 5,600,706 | * 2/1997 | Dunn et al. | 455/456 |
| 5,615,409 | * 3/1997 | Forssen et al. | 450/450 X |
| 5,680,142 | * 10/1997 | Smith et al. | 342/372 |
| 5,680,419 | 10/1997 | Bottomley | 375/347 |
| 5,684,491 | * 11/1997 | Newman et al. | 342/372 X |
| 5,838,673 | * 11/1998 | Ritz et al. | 370/336 |
| 6,072,792 | * 6/2000 | Mazur et al. | 370/345 |

FOREIGN PATENT DOCUMENTS

WO 93/12590    6/1993   (WO).

OTHER PUBLICATIONS

*Adaptive Antenna Arrays for GSM900/DCS1800* by Ulf Forssén, Jonas Karlsson, Björn Johannisson, Magnus Almgren, Fredrik Lotse and Fredric Kronestedt; Proceedings of IEEE Vehicular Technology Conference, 1994; pp. 605–609.

* cited by examiner

Primary Examiner—Huy D. Vu
Assistant Examiner—Kevin C. Harper
(74) Attorney, Agent, or Firm—Jenkens & Gilchrist (57) ABSTRACT

Directional beam generative apparatus, and an associated method, for a radio communication station forms directional antenna beam patterns for the communication of communication signals with remote communication stations operable in a TDMA communication system. Channels are allocated for effectuation of communications between the radio communication station and the remote stations responsive to indications of locations at which the remote communication stations are indicated to be positioned. Remote communication stations indicated to be positioned within a selected area are allocated to channels formed upon a single carrier.

19 Claims, 6 Drawing Sheets

DIRECTIONAL-BEAM GENERATIVE APPARATUS AND ASSOCIATED METHOD

The present invention relates generally to the generation of directional antenna beam patterns at a communication station of a multi-user communication system, such as a cellular communication system, operable pursuant to a TDMA (Time Division Multiple Access) communication scheme. More particularly, the present invention relates to beamforming apparatus, and an associated method, for a transmitting station.

Directional antenna beam patterns are formed in manners which facilitate communication of communication signals with a selected remote communication station during a selected time slot defined in the TDMA communication scheme. The directional antenna beam patterns are, however, formed in manners which permit other remote communication stations to detect the communication signals transmitted by the transmitting station to the selected remote communication stations during the selected time slot.

When embodied, e.g., in a radio base station of a cellular communication system, directional antenna beam patterns are formed during successive time slots defined upon a carrier at least to transmit communication signals to selected mobile terminals. The antenna beam patterns are formed to be of configurations not only to reduce mutual interference with communication signals communicated with other mobile terminals but also to permit other mobile terminals to make use of the portions of the communication signals transmitted to the selected mobile terminals.

BACKGROUND OF THE INVENTION

Utilization of digital communication techniques to communicate information between a transmitting station and a receiving station has become increasingly popular in recent years. Radio communication systems, such as cellular communication systems, are exemplary of communication systems which are increasingly constructed to utilize digital communication techniques.

When a communication signal is formed utilizing a digital communication technique, an information signal is digitized and modulated upon a carrier. Because the information signal is digitized, the communication signal formed therefrom can be transmitted in discrete bursts by a transmitting station upon a communication channel. When the communication signal is received at a receiving station, the bursts are concatenated there together, thereby to recreate the communication signal.

Because communication signals can be transmitted in discrete bursts, a single carrier can be used to transmit more than one communication signal. Time slots are defined upon the carrier, and groups of time slots are formatted into frames. Channels are formed of the particular time slots defined upon the carrier. If more than one carrier is available upon which to communicate the bursts of communication signals during time slots defined upon the carriers, multiplexing, time slots are defined upon the carriers, and channels are defined to be time slot-carrier combinations.

A cellular communication system constructed pursuant to the operational standards of the global system for mobile communications (GSM) is exemplary of a communication system in which time slots are defined upon a carrier and more than one channel is defined upon a single carrier. Systems constructed pursuant to the operational standards of the United States Digital Cellular (USDC) or the Pacific Digital Cellular (PDC) standard are similarly also exemplary of a communication system in which more than one channel is defined upon a single carrier.

A radio base station of the network infrastructure of a cellular communication system includes active antenna apparatus for transducing communication signals between the base station and mobile terminals located in the vicinity of the radio base station. Conventionally, the antenna apparatus of a radio base station is formed of an omni-directional antenna or a sector antenna. A sector antenna is sometimes defined in terms of a radial area of coverage, such as a 120° sector of coverage.

Antenna beam patterns formed by conventional antenna apparatus are generally static in nature. That is to say, the configurations of the antenna beam patterns generally do not vary. Omnidirectional antenna apparatus, for instance, generate omnidirectional, i.e., circular antenna beam patterns throughout which downlink transmissions, i.e., circular antenna beam patterns throughout which downlink transmissions are propagated and throughout which uplink transmissions are detected. Sector antenna apparatus are analogously operable throughout sectorized coverage areas.

Manners have been developed by which the positions of mobile terminals with which the communication signals are communicated are determined. Proposals have been set forth to utilize antenna apparatus which forms directional antenna beam patterns and make use of information of the position of a mobile terminal to select the configuration of the antenna beam pattern.

Directional antenna beam patterns can be selected to encompass the area in which a mobile terminal is positioned while excluding other areas. By forming antenna beam patterns which include elongated lobes in this manner, quality of communications in the cellular communication system can be improved.

By forming the directional antenna beam pattern, the power of a downlink transmission communicated by the radio base station to the mobile terminal is directed towards the mobile terminal. Thereby the transmission range of the radio base station is increased and the possibility that communication of the downlink transmission might interfere with other communications in the cellular communication system is reduced. Analogously, the directionality of the antenna beam pattern reduces the levels of interference of uplink transmissions received by the radio base station on an uplink channel. The sensitivity of the uplink channel is thereby also improved.

Through use of such directional antenna apparatus, the communication capacity of the cellular communication system can also be increased. The reduced levels of interference made possible by the use of such directional antenna apparatus permit such communication capacity increase. Levels of interference are generally determinative of channel reuse patterns which define the rate by which channels can be reused in a cellular communication system. Because levels of interference are reduced, a channel reuse pattern can be formed in which the channels are reused more frequently. Or, if the channel reuse pattern is left unchanged, the quality of the communication links is enhanced. Such enhancement might, for instance, increase data or speech quality of communications between the radio base station and the mobile terminal.

Capacity can also be increased by permitting more than one mobile terminal to communicate upon a single traffic channel within a single coverage area due to the directional nature of the antenna beam patterns which can be formed, communications can be effectuated with a first mobile terminal utilizing one antenna beam pattern and with a second mobile terminal utilizing a second, non-overlapping antenna beam pattern. That is to say, two or more antenna beam patterns can be formed to extend in different directions to permit communications with mobile terminals positioned in different locations within a cell. A two-fold or greater capacity increase in communication capacity over that of a conventional communication system is possible in such an arrangement.

While the proposals for utilization of antenna apparatus capable of generating directional antenna beam patterns advantageously reduces levels of interference in the communication system, cellular system standards require, in some instances, that signal energy generated by a radio base station be detectable by mobile terminals other than the mobile terminal to which communication of a communication signal is to be directed. That is to say, the standards of some cellular communication systems require that a mobile terminal be able to extract information from a downlink transmission communicated to another mobile terminal.

For instance, in some cellular communication systems, there is a requirement that energy be transmitted on a downlink carrier even if communication signals are not being communicated to an active mobile terminal. Detection of the signal energy by a mobile terminal facilitates complexity reduction and facilitates the mobile terminal to become synchronized in the communication system and to facilitate the mobile terminal to track the downlink signal.

Also, in a cellular communication system constructed according to the IS-136 standard, a mobile terminal should be able to utilize training sequences and color codes of communication signals communicated to other mobile terminals.

Such information is utilized by the mobile terminal to enhance function of equalizer circuitry of the mobile terminal. Additionally, no power control is allowed in non-active time slots if one of the slots on the carrier is active, i.e., no power control is admitted on a time slot basis in a communication system constructed according to the IS-136 standards.

In a PDC (Pacific Digital Cellular) communication system, a mobile terminal includes a two-branch, diversity antenna. Selection of an antenna branch to utilize when receiving a downlink transmission directed thereto is made responsive to measurements of signal strengths of signals transmitted to other mobile terminals. The PDC, standard specification sets forth maximum power level reductions of channels defined upon a carrier other than the channel assigned to the mobile terminal to receive downlink transmissions directed thereto.

Also, for instance, in a GSM communication system which provides for GPRS (General Packet Radio Service), a mobile terminal must also be able to detect information transmitted to other mobile terminals. Namely, an uplink state flag transmitted by a radio base station must be detectable by a mobile terminal.

To permit the requirements set forth in the operational standards of various cellular communication systems to be met, a radio base station utilizing directional antenna apparatus must be operable in a manner to permit appropriate information to be detected by mobile terminals other than mobile terminals to which downlink transmissions are to be directed.

It is in light of this background information related to antenna apparatus for transducing communication signals that the significant improvements of the present invention have evolved.

SUMMARY OF THE INVENTION

The present invention, accordingly, advantageously provides beamforming apparatus, and an associated method, for a transmitting station. Indications of locations at which remote communication stations with which communications are to be effectuated are used to select configurations of antenna beam patterns. Directional antenna beam patterns are formed to facilitate the communication of communication signals between the transmitting station and the remote communication stations during selected time slots defined pursuant to a TDMA communication scheme. The directional antenna beam patterns are formed in manners also to facilitate the detection by other remote communication stations of portions of the communication signals transmitted by the transmitting station.

When operative at, for example, a radio base station of a cellular communication system utilizing a TDMA communication scheme, directional antenna beam patterns are formed during successive time slots defined upon a carrier at least to permit transmission of communication signals to selected mobile terminals. Because the antenna beam patterns are directional, communication of downlink transmissions by the radio base station to a selected mobile terminal is less likely to cause interference which adversely affects communications with other mobile terminals. And, because of the directional nature of the antenna beam patterns, uplink transmissions generated by the selected mobile terminal are received by the radio base station with lessened levels of interference introduced thereupon. Channels are allocated for the communication of the communication signals between the radio base station and mobile terminals in manners, however, also to facilitate the detection by other mobile terminals of downlink transmissions by the radio base station.

Appropriate selection of the antenna beam patterns formed during operation of an embodiment of the present invention permit the operational requirements of radio base stations set forth in the standard specifications by which various types of cellular communication systems are constructed while still providing the advantages provided by the use of directional antenna beam patterns. The antenna beam patterns formed to effectuate communications with a selected mobile terminal also permit other mobile terminals to extract information from the downlink transmissions to the selected mobile terminal.

In one aspect of the present invention, a radio transmitter operable pursuant to a TDMA communication scheme includes directional-beam generative apparatus which forms antenna beam patterns to facilitate communication of communication signals between the radio transmitter and selected remote communication stations. In the TDMA communication scheme, bursts of communication signals are transmitted during time slot defined upon a plurality of carriers. Time slot-carrier combinations define channels in such a communications scheme in which groups of time slots on a carrier are formatted into frames. Locations at which at least selected ones of the remote communication stations are determined at, or provided to, the radio transmitter.

A channel allocator receives indications of the location at which the selected remote communication stations are positioned. Responsive thereto, the channel allocator allocates channels upon which to transmit the bursts of communication signals to the selected remote communication stations. Allocations made by the channel allocator are made such that communication signals to be transmitted to remote communication stations indicated to be within a selected area are allocated to channels formed of time slots defined upon a single carrier during at least a selected frame.

Channel allocations made by the channel allocator and communication signals to be transmitted to the remote communication stations are selectively provided to a beamformer. The beamformer forms directional antenna beam patterns by which to permit the transmission of the communication signals upon the channels allocated by the allocator to the selected remote communication stations.

The allocation of the channels in this manner permits minimization of the spatial area in which signal energy is transmitted. By allocating channels formed of time slots defined upon a single carrier to form the allocated channels by which to effectuate communications with mobile terminals positioned in a selected directional area, signal energy generated throughout a frame is maximized in a particular area and minimized elsewhere. Reallocation of the allocated channels is selectively made responsive to indications of movement of mobile terminals beyond their respective original positions within the selected area.

In another aspect of the present invention, the time periods during which the antenna beam patterns are formed is somewhat greater than the time period of a time slot forming the allocated channels. Overlapping, in time, of the antenna beam patterns formed upon successive channels thereby occurs. Such overlapping of the antenna beam patterns facilitates detection of signal energy generated by a radio transmitter by remote communication stations other than the communication stations to which a channel is allocated. That is to say, the antenna beam patterns formed by a beam former are not turned on or off at times exactly corresponding to the time periods of the time slots. Remote communication stations allocated to a channel defined during one time slot are able to extract information from communication signals transmitted to another remote communication station upon a channel defined upon an adjacent time slot.

In another aspect of the present invention, antenna beam patterns are formed at a high power level to facilitate communications upon the channel during which communications with a selected remote communication station are to be effectuated. At other times, the antenna beam patterns are formed at a reduced power level. An antenna beam pattern formed of the summation of the antenna beam patterns permits remote communication stations other than the communication stations to which communications are to be effectuated during selected time slots to extract information from communication signals transmitted to other remote communication stations.

In these and other aspects, beamforming apparatus, and an associated method, is provided for a transmitting station. The transmitting station is operable to transmit communication signals in bursts to remote communication stations upon a plurality of time slots defined upon at least a first carrier. Antenna beam patterns are formed during at least two successive time slots defined upon the at least the first carrier. An allocator is coupled to receive indications of locations at which the remote communication stations are positioned. The allocator allocates a first remote communication station to which to transmit a first communication signal upon a first time slot of the at least two successive time slots. The allocator allocates at least a second remote communication station to transmit at least a second communication signal during at least a second time slot of the at least two successive time slots. The first and the at least second remote communication stations are indicated to be positioned within a first selected area. A beamformer is operable responsive to allocations made by the allocator. The beamformer forms antenna beam patterns by which to permit transmission of the first and the at least second communication signals upon the at least two successive time slots to the first and the at least second remote communication stations.

A more complete appreciation of the present invention and the scope thereof can be obtained from the accompanying drawings which are briefly summarized below, the following detailed description of the presently-preferred embodiments of the present invention, and the appended claims.

DETAILED DESCRIPTION

Figure 1:
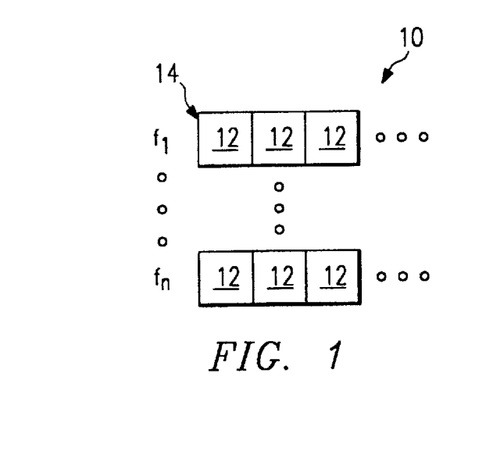
FIG. 1 illustrates an exemplary TDMA communication scheme in which groups of time slots defined upon carriers form channels upon which bursts of communication signals can be transmitted to effectuate communications between communication stations, in accordance with an exemplary embodiment of the present invention.

Referring first to FIG. 1, an exemplary TDMA (Time-Division Multiple Access) communication scheme shown generally at 10, permits a multiple number of communication signals to be communicated between transmitting and receiving stations in a multi-user communication system. The communication scheme 10 shown in the figure is defined upon a frequency bandwidth in which an n number of carriers are defined in a frequency division multiplexing arrangement. The carriers are indicated in the figure by the designations $f_1 \ldots f_n$. Each carrier $f_1$–$f_n$ is divided into time slots 12 of selected time periods. Groups of time slots 12 are formatted into frames 14 of time slots. In the exemplary scheme 10 illustrated in the figure, each frame 14 is formed of three time slots 12. While the figure illustrates a single frame 14 upon two carriers, carriers $f_1$ and $f_n$, successive groups of time slots 12 forming frames 14 are defined upon each of the carriers $f_1$–$f_n$.

Channels are formed of time slot-carrier combinations. Bursts of communication signals are transmitted upon a channel during selected ones of successive frames 14. During transmission of circuit-switched data, the bursts are transmitted typically, but not necessarily upon adjacent groups of frames. And, during transmission of GPRS (General Packet Radio Service) data, the bursts are asynchronously transmitted. When received at a receiving station, the bursts of communication signals are concatenated together, if necessary, to recreate the communication signal generated by a transmitting station.

In a conventional, cellular communication system which utilizes a TDMA communication scheme, such as a GSM communication system, a set of carriers is allocated for downlink transmissions generated by a radio base station to selected mobile terminals. A separate channel is allocated to transmit a communication signal to each of the selected mobile terminals. For instance, in the exemplary scheme 10 illustrated in the figure, as three channels are defined upon each of the carriers $f_1$–$f_n$, downlink transmissions can be effectuated to up to three mobile terminals upon channels defined upon a single carrier.

Conventionally, radio base stations utilize omni-directional or sector antennas. Antenna beam patterns formed by such antenna apparatus are of similar characteristics irrespective of the locations at which mobile terminals, to which downlink transmissions are to be communicated, are positioned. As mentioned previously, some proposals have been set forth to utilize antenna apparatus which generates directional antenna beam patterns responsive to determinations of the locations at which mobile terminals are positioned. Utilization of directional antenna beam patterns reduces levels of interference, thereby to increase communication quality and also to permit an increase in communication capacity of a communication system making use of the directional antenna beam patterns. But, existing cellular communication systems sometimes also require that mobile terminals operable therein also make use of communication signals other than communication signals directed thereto.

An embodiment of the present invention provides a manner by which to provide the benefits of communicating, utilizing directional antenna beam patterns in a radio communication system while also providing a manner by which to permit other mobile terminals to extract information from communication signals transmitted to selected mobile terminals.

Figure 2:
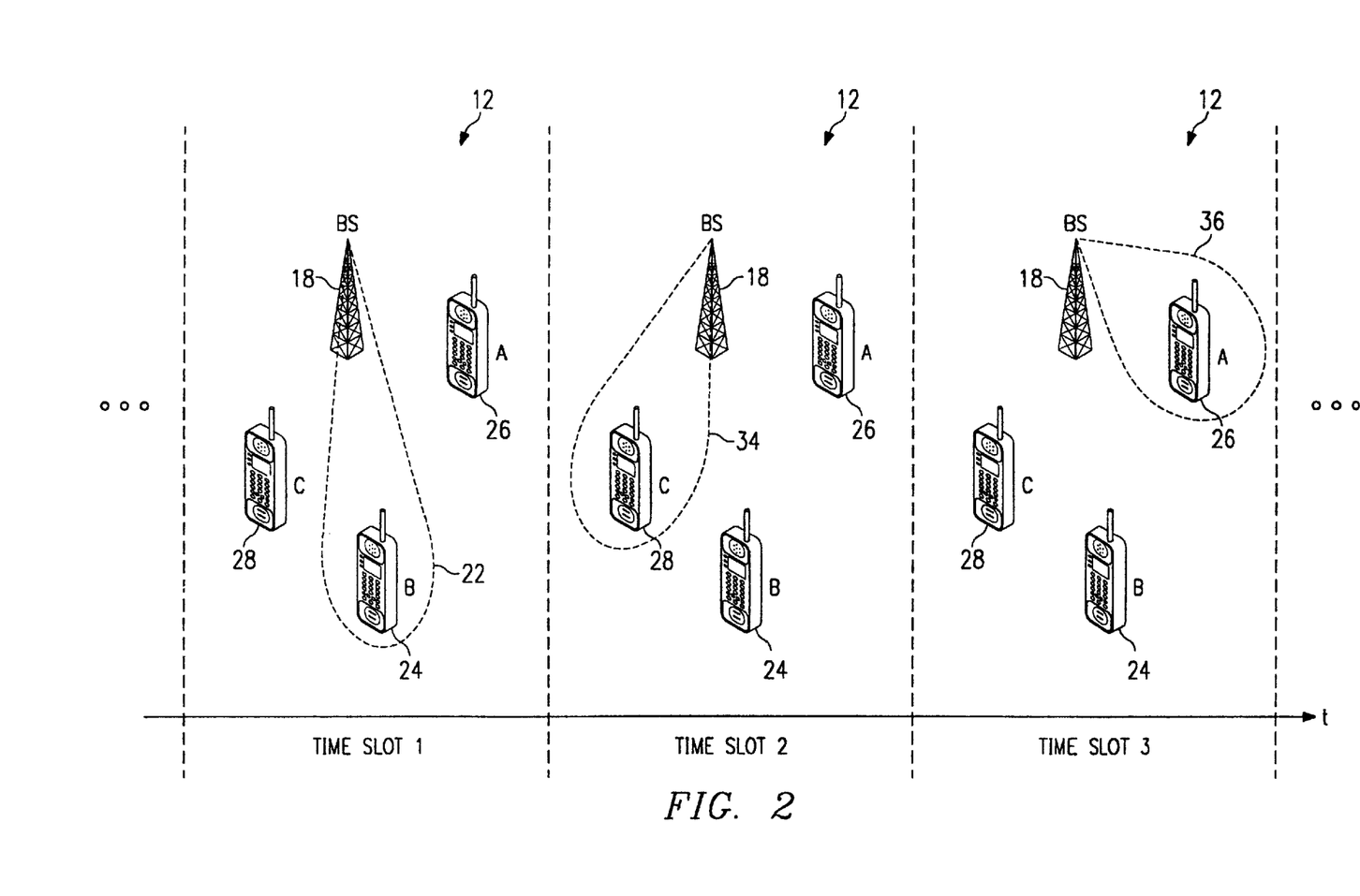
FIG. 2 illustrates exemplary operation of a portion of a cellular communication, with which the present invention may be advantageously applied in an exemplary embodiment, system during three of the time slots of the TDMA communication scheme shown in FIG. 1 in which directional antenna beam patterns are formed to facilitate communications between a radio base station and remotely-positioned, mobile terminals.

FIG. 2 illustrates an exemplary manner by which beam forming techniques can be utilized in a cellular communication system utilizing a TDMA communication scheme. The figure illustrates the generation of antenna beam patterns during three time slots 12 formed to facilitate the transmission of downlink signals by a radio base station 18 or receive uplink signals transmitted thereto. The base station 18 includes antenna apparatus capable of forming directional antenna beams to communicate communication signals between the base station 18 and a plurality of mobile terminals operable in a cellular communication system upon different channels defined upon the different time slots 12.

While FIG. 2, and subsequent figures, shall be described with respect to downlink channels upon which downlink transmissions, either circuit-switched or packet data, are communicated by the radio base station 18 to selected ones of the mobile terminals, transmission of uplink signals generated at a mobile terminal to the radio base station 18 can be similarly be described and represented. More generally, the operation of the embodiment of the present invention shown in FIG. 2, as well as succeeding Figures, is also representative of other multi-user communication systems which utilize a TDMA communication scheme.

The first time slot 12 illustrates an antenna beam pattern 22 formed by antenna apparatus of the radio base station 18 to effectuate communications with a mobile terminal 24. As illustrated, the antenna beam pattern 22 forms an elongated lobe encompassing the location at which the mobile terminal 24 is positioned. Because of the directional nature of the antenna beam pattern 22, lessened levels of signal energy are generated beyond the antenna beam pattern. Hence, lessened levels of interference are introduced upon communications with other mobile terminals, such as the mobile terminals 26 and 28. And, only negligible amounts of interference are introduced upon communications with mobile terminals located elsewhere, such as the mobile terminals 32.

The second time slot 12 illustrates an antenna beam pattern 34 generated by the antenna apparatus of the radio base station 18 when downlink transmissions are to be communicated to the mobile terminal 28. Again, the antenna beam pattern 34 includes an elongated lobe, here encompassing the location at which the mobile terminal 28 is positioned. Lessened amounts of interference are generated beyond the antenna beam pattern 34, and only negligible amounts of interference are generated as a result of downlink transmissions to the mobile terminal 28 upon other mobile terminals, such as the mobile terminals 32 positioned in directions opposing the longitudinal direction of the antenna beam pattern 34.

The third time slot 12 illustrates an antenna beam pattern 36 formed by the antenna apparatus of the radio base station 18 when downlink transmissions are to be communicated to the mobile terminal 26. Again, the antenna beam pattern 36 includes an elongated lobe which encompasses the location at which the mobile terminal 26 is positioned. Levels of signal energy of the downlink transmission beyond the antenna beam pattern 36 are significantly less than the signal energy levels within the antenna beam pattern 36. And, only negligible amounts of signal energy are generated in directions other than the directions at which the antenna beam pattern 36 extend.

Figure 3:
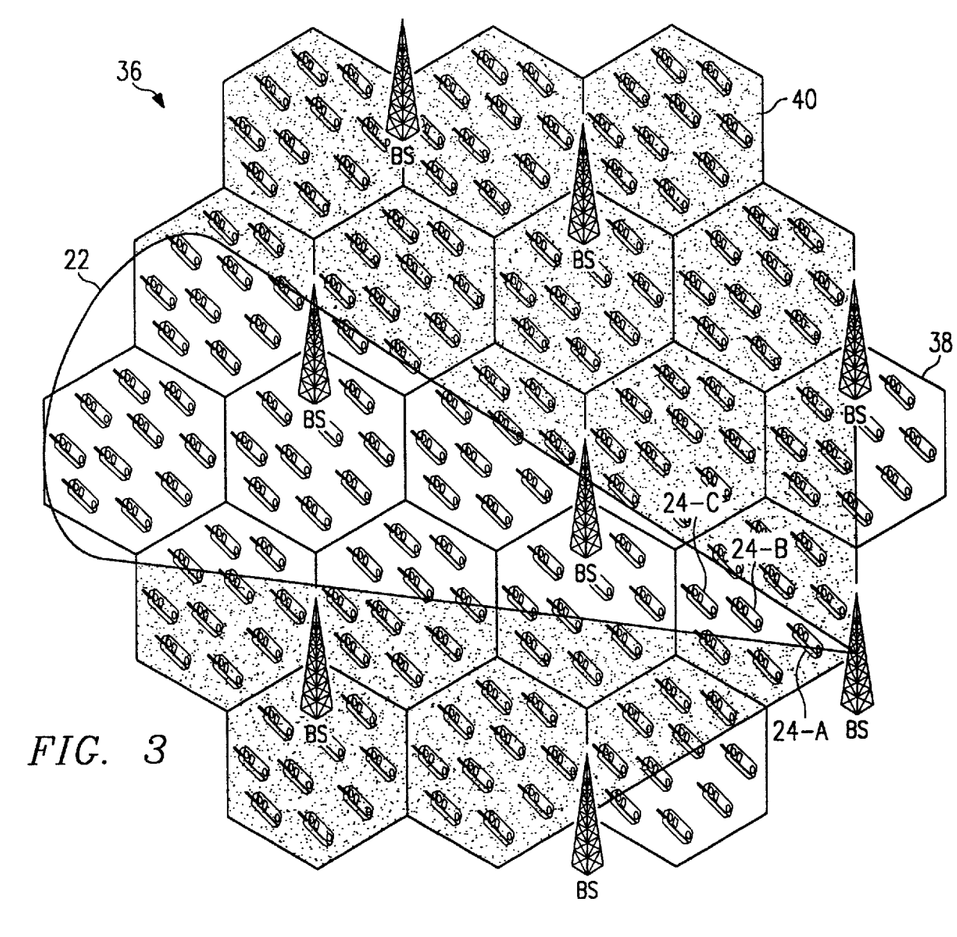
FIG. 3 illustrates exemplary operation of an embodiment of the present invention.

FIG. 3 illustrates a portion of a cellular communication system shown generally at 36, in which an embodiment of the present invention is operable. As illustrated, the communication system 36 includes a plurality of cells 38. Each cell 38 is defined by a coverage area of a radio base station 18. A directional beam pattern 22 formed by one of the radio base stations 18 is also shown in the figure. The antenna beam pattern 22 is elongated, for purposes of illustration, to encompass more than one cell 38. Of significance, however, is the positioning of three mobile terminals, mobile terminals 24-A, 24-B, and 24-C. Such mobile terminals are positioned within the coverage area of the antenna beam pattern 22.

During operation of an embodiment of the present invention, when channels are allocated to communicate communication signals between the radio base station 18 which forms the antenna beam pattern 22 and mobile terminals positioned within the cell 38 encompassed by the radio base station, indications of the locations at which the mobile terminals are positioned are determinative of the channel allocations.

When allocating channels, mobile terminals positioned in the same, or similar, directional areas are allocated channels on the same carrier. As illustrated in FIG. 3, communication downlink transmissions to be communicated to the mobile terminals 24-A, 24-B, and 24-C are allocated to channels defined upon the same carrier, i.e., upon channels formed upon successive time slots, here channels which are adjacent to one another. Communication downlink transmissions to be communicated to other mobile terminals are allocated to channels on other carriers. Thereby, the spatial area in which signal energy is transmitted is minimized.

Reallocation of the channel allocations are made at selected intervals responsive to movement of the mobile terminals into or out of the selected directional areas.

The figure further illustrates an antenna beam pattern 40, again enlarged for purposes of illustration. The antenna beam pattern 40 is that of a conventional, 120 degree, sector antenna, conventionally positioned at a radio base station and a receiving station. If necessary, during operation of an embodiment of the present invention, if a mobile terminal must be allocated to a time slot on the same carrier upon which time slots are allocated to the mobile terminals 24-A, 24-B, and 24-C, the antenna beam pattern formed by the radio base station 18 can also be altered to encompass radial areas, as necessary, up to the radial areas encompassed by the antenna beam pattern 40 to ensure that all mobile terminals allocated time slots on the single carrier are able to extract adjacent time-slot information.

Figure 4:
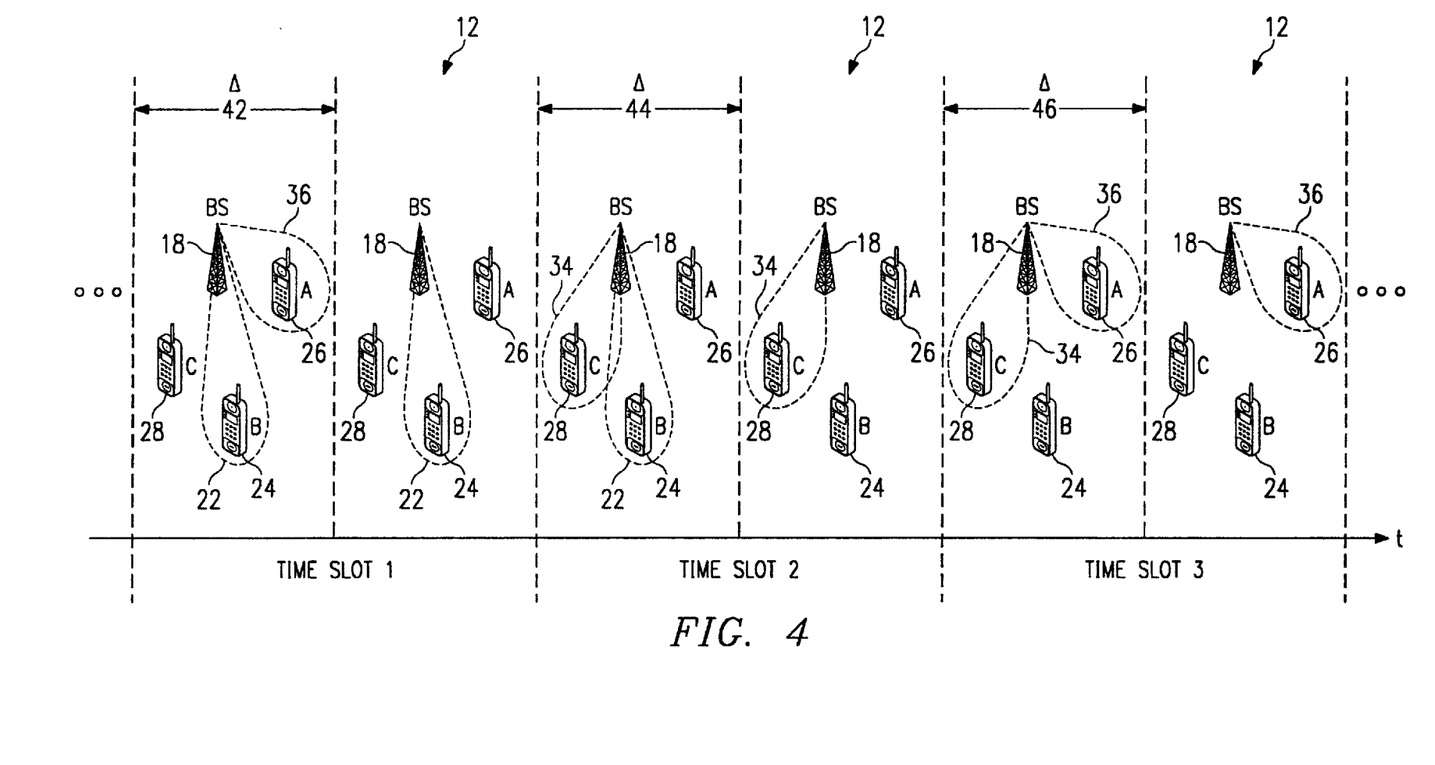
FIG. 4 illustrates exemplary operation of a portion of a cellular communication system according to another embodiment of the present invention.

FIG. 4 illustrates operation of another embodiment of the present invention through which channels are allocated upon time slots 12 to effectuate communication of downlink transmissions generated by the radio base station 18 to the mobile terminals 24, 26, and 28. During the first time slot, an antenna beam pattern 22 is formed to effectuate communication of a downlink transmission to the mobile terminal 24. Here, the first time slot further forms a transition time period 42. During the transition time period 42, in addition to the formation of the antenna beam pattern 22 by the antenna apparatus of the radio base station 18, the antenna beam pattern 36 is also formed. Communication of the downlink transmission is effectuated both to the mobile terminal 24 and to the mobile terminal 26 during the transition time period 42. Subsequent to the transition time period 42, the antenna beam pattern 36 is no longer formed, and only the antenna beam pattern 22 is formed.

Analogously, during the second time slot 12, the antenna beam pattern 34 is again formed by the antenna apparatus of the radio base station 18. The antenna beam pattern 34 permits effectuation of communication of downlink transmissions to the mobile terminal 28. The channel defined upon the second time slot 12 further includes a transition time period 44. During the transition time period 44, the antenna apparatus of the radio base station 18 also forms the antenna beam pattern 22. Downlink transmissions to be communicated to the mobile terminal 28 during the second time slot 12 are also communicated to the mobile terminal 24 during the transition time period 44. Subsequent to the transition time period 44 the antenna beam pattern 34 is not formed, and only the antenna beam pattern 34 is formed.

And, during the third time slot 12, the antenna beam pattern 36 is again formed by antenna apparatus of the radio base station 18. Formation of the antenna beam pattern 36 permits communication of a downlink transmission to the mobile terminal 26. A transition time period, here transition time period 46, is also formed during a portion of the third time slot 12. During the transition time period 46, the antenna beam pattern 34 is also formed by the antenna apparatus of the radio base station 18. Communication signals forming downlink transmissions generated at the base station 18 to be communicated to the mobile terminal 26 are also communicated to the mobile terminal 28. Subsequent to the transition time period 46, the antenna beam pattern 34 is no longer formed, and only the antenna beam pattern 36 is formed.

During each of the transition time periods 42, 44, and 46, antenna beam patterns are formed which permit the communication of downlink transmissions to two mobile terminals. During such transition time periods, downlink transmissions are communicated not only to the mobile terminals to which the channels are allocated, but also to mobile terminals to whom adjacent channels are allocated for downlink transmissions. That is to say, during the first time slot 12, downlink transmissions are communicated to the mobile terminal 26 in addition to the mobile terminal 24 upon which the downlink transmission is otherwise intended. During the second time slot 12, downlink transmissions are communicated to the mobile terminal 24 in addition to the mobile terminal 28. And, during the third time slot 12, downlink transmissions are communicated to the mobile terminal 28 in addition to the mobile terminal 26.

Because of the partial overlapping of the antenna beam patterns during the transition time periods 42, 44, and 46, mobile terminals can extract information from downlink transmission intended to be communicated to others of the mobile terminals. Thereby, mobile terminal operation requiring extraction of information from communication signals transmitted to other mobile terminals to facilitate their operation is possible. For example, a given mobile terminal may include receiver circuitry having equalizers, and the downlink transmissions intended to be communicated to other mobile terminals may include training sequences as portions thereof, The given mobile terminal utilizes the training sequences of the downlink transmissions intended to be communicated to the other mobile terminal(s) in one time slot to facilitate equalization of downlink transmission intended to be communicated to the given mobile terminal in another time slot.

Figure 5:
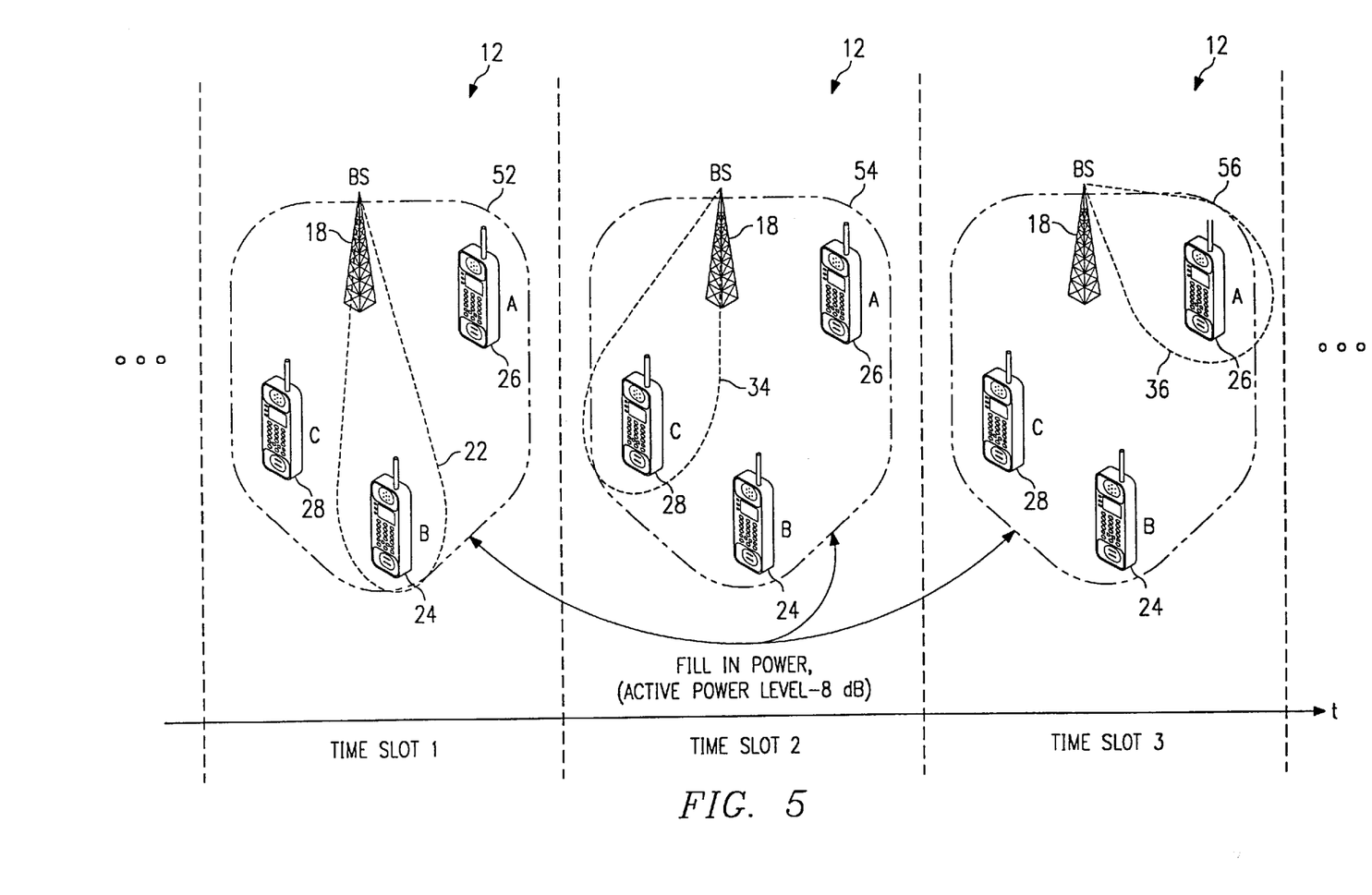
FIG. 5 illustrates exemplary operation, analogous to the operation shown in FIG. 4, of a portion of a cellular communication system according to another embodiment of the present invention.

FIG. 5 illustrates operation of another embodiment of the present invention by which to communicate downlink transmissions generated at the radio base station 18 to selected mobile terminals, here mobile terminals 22, 26, and 28. In this embodiment, directional antenna beam patterns are again formed by antenna apparatus positioned at the radio base station 18.

Similar to the operation of the embodiments illustrated in FIGS. 3 and 4, FIG. 5 illustrates three time slots 12 during which channels are allocated, successively, to communicate downlink transmissions to the mobile terminal 22, the mobile terminal 28, and the mobile terminal 26.

During the first time slot 12, a channel is allocated to permit the communication of a downlink transmission to the mobile terminal 22. The antenna apparatus of the radio base station 18 again forms an antenna beam pattern 22 responsive to indications of the location at which the mobile terminal 24 is positioned. The antenna beam pattern 22 is formed for substantially the entire period of the first time slot 12. The active power level at which the antenna beam pattern 22 is formed during the first time slot 12 is of a high, active power level.

The antenna apparatus of the radio base station 18 further generates antenna beam patterns of reduced power levels throughout the selected area in which the mobile terminals 24, 26, and 28 are positioned. An antenna beam pattern of the reduced, active power level is represented in the figure by the antenna beam pattern 52. The antenna beam pattern 52 may be formed, for example, by generating directional antenna beam patterns analogous to the antenna beam patterns 34 and 36 (shown in FIGS. 3 and 4), but of a reduced power level together with "fill-in" antenna beam power to form the configuration of the antenna beam pattern 52. The downlink transmission communicated by the radio base station 18 to the mobile terminal 24 is also transmitted throughout the area encompassed by the antenna beam pattern 52. Thereby, information of the downlink transmission to the mobile terminal 24 can be extracted by the mobile terminals 26 and 28.

Analogously, the antenna apparatus of the radio base station 18 forms an antenna beam pattern 34 to permit communication of a downlink transmission to the mobile terminal 28 upon the channel defined upon the second time slot 12. The active power level at which the antenna beam pattern 34 is formed is of a high power level. The antenna apparatus further forms an antenna beam pattern 54 of a reduced power level. The power level is reduced, e.g., by 8 dB relative to the power level at which the antenna beam pattern 34 is formed. The downlink transmission to be communicated to the mobile terminal 28 is broadcast throughout the area encompassed by the antenna beam pattern 54. Thereby, the mobile terminals 24 and 26 are able to extract information from the downlink transmission.

And, during the channel defined upon the third time slot 12, the antenna apparatus of the radio base station 18 forms an antenna beam pattern 36 to permit the communication of a downlink transmission to the mobile terminal 26. The antenna beam pattern 36 is of a high, active power level. The antenna apparatus also forms an antenna beam pattern 56 of a reduced power level, again, e.g., of a level 8 dB less than the power level at which the antenna beam pattern 36 is formed. The antenna beam pattern 56 may also be formed by the generation of the directional antenna beam patterns 22 and 34 together with active, fill-in power. The downlink transmission to be communicated to the mobile terminal 26 is also broadcast throughout the area encompassed by the antenna beam pattern 56. Thereby, the mobile terminals 24 and 28 are able to extract information from such downlink transmission.

Figure 6:
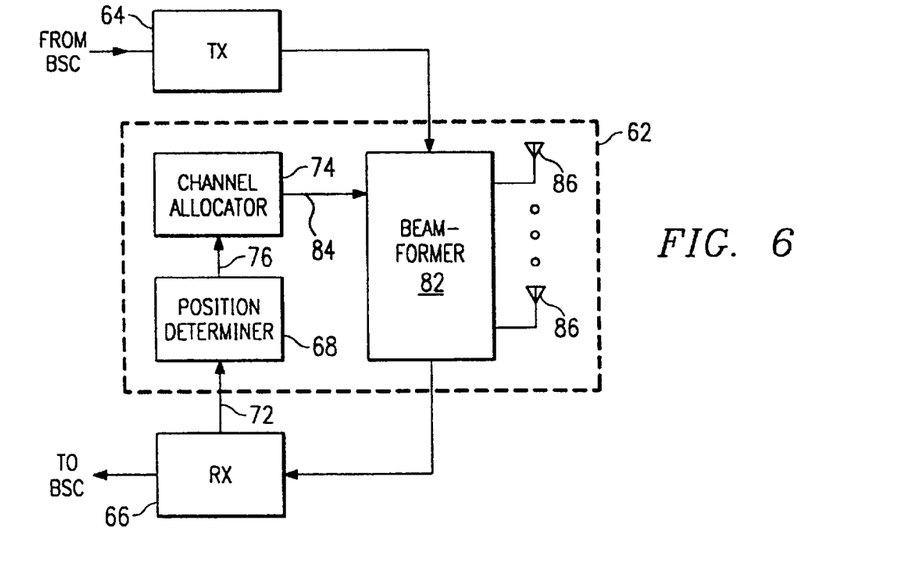
FIG. 6 illustrates a functional block diagram of the apparatus of an embodiment of the present invention, here forming a portion of the radio base station shown in FIGS. 2, 3, 4 and 5.

FIG. 6 illustrates a portion of the radio base station 18 shown previously in FIGS. 2–5 together with the antenna apparatus, shown at 62, of an embodiment of the present invention. The transmitter 64 and receiver portions 66 of the base station 18 are shown as single blocks in the figure. The transmitter 64 portion is representative of the transmitter elements which transmit downlink transmissions upon a plurality of channels to a plurality of mobile terminals. The transmitter 64 portion is coupled to other portions of a PLMN (Public Land Mobile Network), such as a BSC (Base Station Controller) in conventional manner.

The receiver 66 portion of the base station 18 similarly is representative of receiver circuitry capable of receiving uplink transmissions received upon a plurality of channels from a plurality of mobile terminals. The receiver 66 portion is also coupled to other portions of a PLMN, such as a BSC, in conventional fashion.

The antenna apparatus 62 is operable to allocate channels upon which downlink and uplink transmissions are communicated by the transmitter and receiver portions 64 and 66, respectively. In addition to allocating the channels, the antenna apparatus 62 forms the antenna beam patterns, such as those shown in the embodiment of which operation is illustrated in the FIGS. 3–5.

The antenna apparatus 62 includes a position determiner 68 coupled to the receiver 66 portion. The position determiner 68 is operable, responsive to indications of signals received by the receiver 66 portion on lines 72. The position determiner 68 is operable to determine the locations at which mobile terminals are positioned relative to the radio base station 18. In one embodiment, the position determiner 68 determines the radial direction, relative to the radio base station, at which the mobile terminals are located.

Indications of the locations at which the mobile terminals are located are provided to an allocator 74 by way of lines 76. The channel allocator 74 is operable to allocate channels upon which communications between the radio base station 18 and selected mobile terminals are to be effectuated. With reference to operation of the embodiment illustrated in FIG. 2, the allocator allocates channels upon which downlink and uplink transmissions are to be communicated responsive to positioning of selected mobile terminals within a selected area. The channel allocator allocates channels for communications with mobile terminals located within a selected area, as determined by the position determiner 68. With respect to the embodiments of which operation is represented in FIGS. 4 and 5, the allocator 74 similarly is operable to allocate channels on a single carrier for communications with mobile terminals determined by the position determiner 68 to be located within a selected area. Other mobile terminals determined to be positioned within other selected areas are analogously allocated channels on other carriers.

A beamformer 82 is coupled to the channel allocator 74 by way of lines 84. The channel allocator provides indications of the channels allocated thereat to the beamformer 82. The beamformer 82 is operable responsive to the indications provided thereto to form antenna beam patterns in manners described previously with respect to FIGS. 3, 4, and 5.

In one embodiment, the beamformer 82 is formed of an antenna matrix, such as a Butler matrix having a plurality of antenna elements, of which the antenna elements 86 are representative. The beamformer 82 is further coupled to the transmitter 64 portion and to the receiver 66 portion to receive the downlink transmissions which are to be communicated to selected mobile terminals and to provide uplink transmissions received thereat to the receiver 66 portion.

As described with respect to FIGS. 3–5 above, the beamformer 82 forms directional antenna beam patterns to facilitate the effectuation of communications between the selected mobile terminals and the radio base station 18. Operation of the antenna apparatus 62 causes antenna beam patterns to be formed in manners which also facilitate the extraction by other mobile terminals of downlink transmissions communicated by the radio base station.

Figure 7:
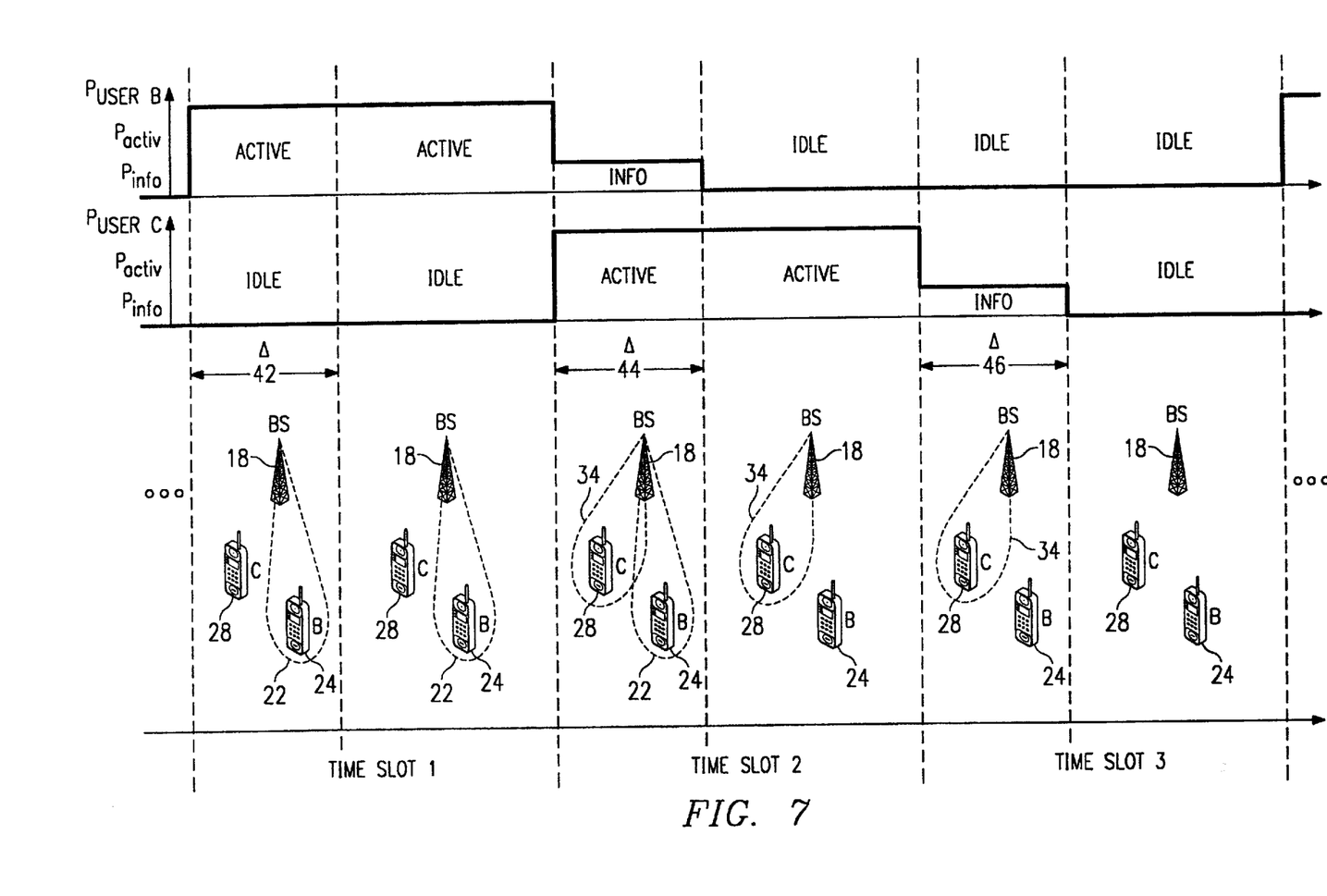
FIG. 7 illustrates exemplary operation, analogous to the operation shown in FIGS. 3–5, of a portion of a cellular communication system according to an embodiment of the present invention.

FIG. 7 illustrates operation of an embodiment of the present invention by which downlink transmissions are communicated to selected mobile terminals. The embodiment illustrates is analogous to that described with respect to FIG. 4. And, again, the first, second, and third time slots 12 have defined thereon transition time periods 42, 44, and 46, respectively.

FIG. 7 illustrates the radio base station 18 and the antenna beam patterns 22 and 34 formed by antenna apparatus thereof to effectuate communication of downlink transmissions to the mobile terminals 24 and 28, respectively.

Top portions of the figure represent graphically the power levels of the downlink transmissions to the mobile terminals 24 and 28.

During the transition time period 42, the mobile terminal 28 is in an idle mode and no signal energy is transmitted to the mobile terminal 28. However, during the transmission time period 42, the mobile terminal 24 is in the active mode, and signal energy of an active power level is transmitted to the mobile terminal 24. Similarly, during the remaining portions of the channel defined upon the first time slot 12, the mobile terminal 28 remains in an idle mode and no signal energy is transmitted thereto. But, the mobile terminal 24 is in the active mode, and signal energy of an active power level is transmitted thereto.

During the channel defined upon the second time slot 12, the mobile terminal 28 is in the active mode, and signal energy levels of an active power level is transmitted to the mobile terminal 28. During the transition time period 44, the mobile terminal 24 is in an information mode to extract information of downlink transmissions communicated to the mobile terminal 28. Signal energy of an information power level is communicated to the mobile terminal 24. Subsequent to the transition time period 44, the mobile terminal 24 returns to an idle state, and signal energy is not transmitted to the mobile terminal 24.

During the channel defined upon the third time slot 12, neither the mobile terminal 24 nor the mobile terminal 28 is in the active mode. The mobile terminal 28, however, is in the information mode during the transition time period 46, and signal energy of an information power level is transmitted to the mobile terminal 28. Subsequent to the transition time period 46, the mobile terminal 28 returns to an idle mode, and signal energy is not transmitted thereto. During the entire time period of the third time slot 12, the mobile terminal 24 is in an idle mode, and signal energy is not transmitted thereto by the radio base station 18.

Figure 8:
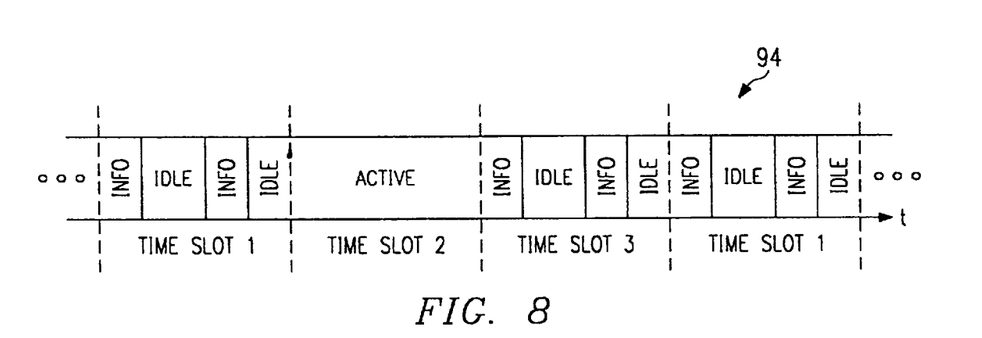
FIG. 8 illustrates state scheduling of a mobile terminal operable pursuant to an embodiment of the present invention.

FIG. 8 illustrates a mobile state scheduling chart 94 indicating the states of a mobile terminal tuned to a carrier divided into three time slots 12, as described previously. The mobile terminal is caused to be in one of three states, an idle state, an active state, and an information state. When in an active state, wanted designated data is to be communicated as a downlink transmission to the mobile terminal. When in an information state, the mobile terminal is operable to extract information from downlink transmissions communicated to other mobile terminals. And, when in the idle state, the mobile terminal is not operable to receive or to extract information from any downlink transmission.

As illustrated in the figure, when in an active state, the mobile terminal remains in such state for the entire period of a time slot, here the second time slot 12. The mobile terminal is in an information state for only portions of a time slot, here the first and third time slots 12. In the embodiment illustrated in the figure, during the first and third time slots, the mobile terminal enters the information state at the start-side and close to the end-side of the time slot. When in such state, signal energy formed of downlink transmissions communicated thereto are detected by the mobile terminal.

Figure 9:
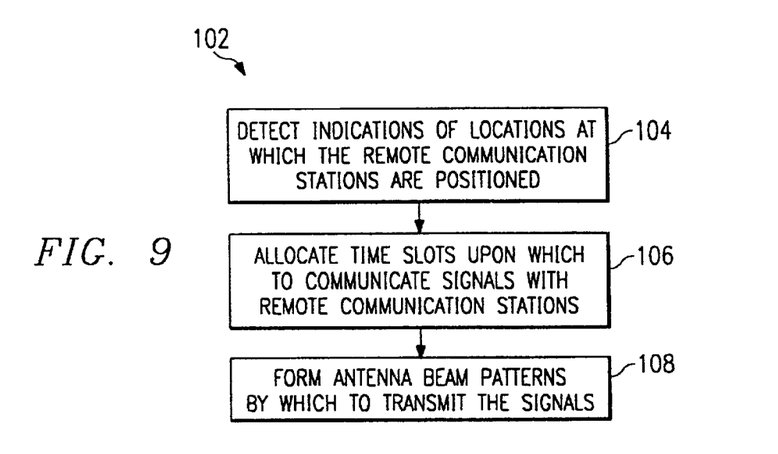
FIG. 9 illustrates a method flow diagram illustrating the method steps of the method of an embodiment of the present invention.

FIG. 9 illustrates a method, shown generally at 102, of the method of an embodiment of the present invention. The method forms antenna beam patterns during at least two successive time slots defined upon a first carrier by which to communicate communication signals between a transmitting station and remote communication stations.

First, and as indicated by block 104, indications of locations at which the remote communication stations are positioned are detected.

Then, and as indicated by the block 106, a first remote communication station to which to transmit a first communication signal upon a first time slot of at least two successive time slots is allocated. And, at least a second remote communication station to transmit at least a second communication signal during at least a second time slot is allocated. The first and second remote communication stations are within a first selected area. Then, and as indicated by the block 108, antenna beam patterns by which to permit transmission of the first and the at least second communication signals upon the at least two successive time slots are formed.

Operation of the various embodiments of the present invention form directional antenna beam patterns by which downlink transmissions are communicated by a radio base station to a selected mobile terminal. Communications effectuated by way of such antenna beam patterns are less likely to cause interference which adversely affects communications with other mobile terminals. Because of the directional nature of the antenna beam patterns, uplink transmissions generated by the selected mobile terminals are received by the base station with lessened levels of interference introduced thereupon. The channels are allocated for the communication of the communication signals between the radio base station and the mobile terminals in manners also to facilitate the detection by other mobile terminals of downlink transmissions by the radio base station.

The previous descriptions are of preferred examples for implementing the invention, and the scope of the invention should not necessarily be limited by this description. The scope of the present invention is defined by the following claims.

What is claimed is:

1. In a transmitting station operable to transmit communication signals in bursts to remote communication stations upon a plurality of time slots defined upon at least a first carrier, an improvement of beamforming apparatus for forming antenna beam patterns during at least two successive time slots defined upon the at least the first carrier, said beamforming apparatus comprising:

an allocator coupled to receive indications of locations at which the remote communication stations are positioned. Said allocator for allocating a first remote communication station to which to transmit a first communication signal upon a first time slot of the at least two successive time slots and for allocating at least a second remote communication station to transmit at least a second communication signal during at least a second time slot of the at least two successive time slots, the first and the at least second remote communication stations, respectively, indicated to be positioned within a first selected area, the first time slot and the second time slot being allocated based, at least in part, on the indication that the first and the at least second remote communication station are positioned within the first selected area, the first time slot differing from the second time slot;

a beamformer operable responsive to allocations made by said allocator, said beamformer for forming antenna beam patterns by which to permit transmission of the first and the at least second communication signals, respectively, upon the at least two successive time slots to the first and the at least second remote communication stations; and wherein the antenna beam patterns formed by said beamformer during the two successive time slots at least partially overlap in time during at least a portion of the two successive time slots.

2. The apparatus of claim 1 wherein the transmitting station is operable to transmit communication signals to a group of communication stations during time slots defined upon a plurality of carriers, the group of remote communication stations formed of at least a first set formed of the first and second remote communication stations indicated to be positioned within the first selected area and at least a third remote communication station indicated to be positioned within a second selected area, said allocator further for allocating at least one time slot defined upon a second carrier upon which to transmit a third communication signal thereto.

3. The apparatus of claim 1 wherein said remote communication stations comprise mobile terminals and wherein said allocator allocates a first mobile terminal and at least a second mobile terminal, said allocator further for selectively reallocating which mobile terminals form the first mobile terminal and the at least second mobile terminal to which to transmit the first and at least second communication signals, respectively, upon the at least two successive time slots, reallocation selectively made by said allocator responsive to movement of at least one of the first and the at least second mobile terminals beyond the first selected area.

4. The apparatus of claim 1 further comprising a determiner for determining the locations at which the remote communication stations are positioned.

5. The apparatus of claim 1 wherein the indications of the locations at which the remote communication stations are positioned to which said allocator is coupled to receive comprise radial positions of the remote communication stations relative to the transmitting station.

6. The apparatus of claim 1 wherein said allocator comprises a processing device having an allocation algorithm executable therein for allocating the at least two successive time slots upon which the first and the at least second communication signals are to be transmitted.

7. The apparatus of claim 1 wherein the transmitting station comprises a radio base station of a cellular communication system, the remote communication stations comprise mobile terminals, and wherein said allocator allocates a first mobile terminal to receive the first communication signal during the first time slot of the at least two successive time slots and allocates at least a second mobile terminal to receive the at least second communication signal during the second time slot of the at least two successive time slots.

8. The apparatus of claim 1 wherein the first time slot and the second time slot to which said allocator allocates first and second remote communication stations to transmit the first and second communication signals are adjacent to one another.

9. The apparatus of claim 1 wherein the first time slot and the second time slot to which said allocator allocates the first and second remote communication stations to transmit the first and second communication signals are non-adjacent to one another.

10. In a transmitting station operable to transmit communication signals in bursts to remote communication stations upon a plurality of time slots defined upon at least a first carrier, an improvement of beamforming apparatus for forming antenna beam patterns during at least two successive time slots defined upon the at least the first carrier, said beamforming apparatus comprising:

an allocator coupled to receive indications of locations at which the remote communication stations are positioned, said allocator for allocating a first remote communication station to which to transmit a first communication signal upon a first time slot of the at least two successive time slots and for allocating at least a second remote communication station to transmit at least a second communication signal during at least a second time slot of the at least two successive time slots, the first and the at least second remote communication stations, respectively, indicated to be positioned within a first selected area, the first time slot and the second time slot being allocated based, at least in part, on the indication that the first and the at least second remote communication station are positioned within the first selected area, the first time slot differing from the second time slot;

a beamformer operable responsive to allocations made by said allocator, said beamformer for forming antenna beam patterns by which to permit transmission of the first and the at least second communication signals, respectively, upon the at least two successive time slots to the first and the at least second remote communication stations;

wherein the antenna beam patterns formed by said beamformer during the two successive time slots at least partially overlap during at least a portion of the two successive time slots; and wherein at least one of the first and the second time slots, respectively, having defined thereon a transition time period, the antenna beam patterns formed by said beamformer including a first antenna beam pattern generated during the first time slot and a second antenna beam pattern generated during the second time slot, both the first antenna beam pattern and the second antenna beam pattern generated during the transition time period.

11. In a transmitting station operable to transmit communication signals in bursts to remote communication stations upon a plurality of time slots defined upon at least a first carrier, an improvement of beamforming apparatus for forming antenna beam patterns during at least two successive time slots defined upon the at least the first carrier, said beamforming apparatus comprising:

an allocator coupled to receive indications of locations at which the remote communication stations are positioned, said allocator for allocating a first remote communication station to which to transmit a first communication signal upon a first time slot of the at least two successive time slots and for allocating at least a second remote communication station to transmit at least a second communication signal during at least a second time slot of the at least two successive time slots, the first and the at least second remote communication stations, respectively, indicated to be positioned within a first selected area, the first time slot and the second time slot being allocated based, at least in part, on the indication that the first and the at least second remote communication station are positioned within the first selected area, the first time slot differing from the second time slot;

a beamformer operable responsive to allocations made by said allocator, said beamformer for forming antenna beam patterns by which to permit transmission of the first and the at least second communication signals, respectively, upon the at least two successive time slots to the first and the at least second remote communication stations; and wherein said beamformer forms a first antenna beam pattern at a first power level during the first time slot and at a second, reduced power level during the second time slot, and forms a second antenna beam pattern at a third power level during the second time slot and at a fourth, reduced power level during the first time slot.

12. The apparatus of claim 11 wherein the second, reduced power level at which the first antenna beam pattern is formed during the second time slot and the fourth, reduced power level at which the second antenna beam pattern is formed during the first time slot are of substantially similar power levels.

13. In a transmitting station operable to transmit communication signals in bursts to remote communication stations upon a plurality of time slots defined upon at least a first carrier, an improvement of beamforming apparatus for forming antenna beam patterns during at least two successive time slots defined upon the at least the first carrier, said beamforming apparatus comprising:

an allocator coupled to receive indications of locations at which the remote communication stations are positioned, said allocator for allocating a first remote communication station to which to transmit a first communication signal upon a first time slot of the at least two successive time slots and for allocating at least a second remote communication station to transmit at least a second communication signal during at least a second time slot of the at least two successive time slots, the first and the at least second remote communication stations, respectively, indicated to be positioned within a first selected area, the first time slot and the second time slot being allocated based, at least in part, on the indication that the first and the at least second remote communication station are positioned within the first selected area, the first time slot differing from the second time slot;

a beamformer operable responsive to allocations made by said allocator, said beamformer for forming antenna beam patterns by which to permit transmission of the first and the at least second communication signals, respectively, upon the at least two successive time slots to the first and the at least second remote communication stations;

wherein the antenna beam patterns formed by said beamformer during the two successive time slots at least partially overlap during at least a portion of the two successive time slots;

wherein the transmitting station comprises a radio base station of a cellular communication system, the remote communication stations comprise mobile terminals, and wherein said allocator allocates a first mobile terminal to receive the first communication signal during the first time slot of the at least two successive time slots and allocates at least a second mobile terminal to receive the at least second communication signal during the second time slot of the at least two successive time slots; and wherein the mobile terminals include diversity antennas having antenna branches and wherein the first mobile terminal utilizes characteristics of the second communication signal transmitted during the second time slot to select which of the antenna branches of the diversity antenna of the first mobile terminal at which to receive the first communication signal thereto during the first time slot.

14. In a transmitting station operable to transmit communication signals in bursts to remote communication stations upon a plurality of time slots defined upon at least a first carrier, an improvement of beamforming apparatus for forming antenna beam patterns during at least two successive time slots defined upon the at least the first carrier, said beamforming apparatus comprising:

an allocator coupled to receive indications of locations at which the remote communication stations are positioned, said allocator for allocating a first remote communication station to which to transmit a first communication signal upon a first time slot of the at least two successive time slots and for allocating at least a second remote communication station to transmit at least a second communication signal during at least a second time slot of the at least two successive time slots, the first and the at least second remote communication stations, respectively, indicated to be positioned within a first selected area, the first time slot and the second time slot being allocated based, at least in part, on the indication that the first and the at least second remote communication station are positioned within the first selected area, the first time slot differing from the second time slot;

a beamformer operable responsive to allocations made by said allocator, said beamformer for forming antenna beam patterns by which to permit transmission of the first and the at least second communication signals, respectively, upon the at least two successive time slots to the first and the at least second remote communication stations;

wherein the antenna beam patterns formed by said beamformer during the two successive time slots at least partially overlap during at least a portion of the two successive time slots;

wherein the transmitting station comprises a radio base station of a cellular communication system, the remote communication stations comprise mobile terminals, and wherein said allocator allocates a first mobile terminal to receive the first communication signal during the first time slot of the at least two successive time slots and allocates at least a second mobile terminal to receive the at least second communication signal during the second time slot of the at least two successive time slots; and wherein the first mobile terminal is operable further to transmit packet data and wherein the first mobile terminal utilizes information contained in the second communication signal transmitted during the second time slot via a first antenna beam pattern of the antenna beam patterns that is directed to the first mobile terminal to determine whether to transmit a packet of data during a subsequent time slot, the second communication signal also being transmitted during the second time slot via a second antenna beam pattern of the antenna beam patterns that is directed to the at least second mobile terminal.

15. In a transmitting station operable to transmit communication signals in bursts to remote communication stations upon a plurality of time slots defined upon at least a first carrier, an improvement of beamforming apparatus for forming antenna beam patterns during at least two successive time slots defined upon the at least the first carrier, said beamforming apparatus comprising:

an allocator coupled to receive indications of locations at which the remote communication stations are positioned, said allocator for allocating a first remote communication station to which to transmit a first communication signal upon a first time slot of the at least two successive time slots and for allocating at least a second remote communication station to transmit at least a second communication signal during at least a second time slot of the at least two successive time slots, the first and the at least second remote communication stations, respectively, indicated to be positioned within a first selected area, the first time slot and the second time slot being allocated based, at least in part, on the indication that the first and the at least second remote communication station are positioned within the first selected area, the first time slot differing from the second time slot;

a beamformer operable responsive to allocations made by said allocator, said beamformer for forming antenna beam patterns by which to permit transmission of the first and the at least second communication signals, respectively upon the at least two successive time slots to the first and the at least second remote communication stations; and wherein the transmitting station is operable to transmit communication signals to a group of remote communication stations, the second remote communication station allocated by said allocator indicated to be the remote communication station of the group of remote communication stations most closely positioned to the first remote communication station, the position of the first and second remote communication stations defining the selected area.

16. In a transmitting station operable to transmit communication signals in bursts to remote communication stations upon a plurality of time slots defined upon at least a first carrier, an improvement of beamforming apparatus for forming antenna beam patterns during at least two successive time slots defined upon the at least the first carrier, said beamforming apparatus comprising:

an allocator coupled to receive indications of locations at which the remote communication stations are positioned, said allocator for allocating a first remote communication station to which to transmit a first communication signal upon a first time slot of the at least two successive time slots and for allocating at least a second remote communication station to transmit at least a second communication signal during at least a second time slot of the at least two successive time slots, the first and the at least second remote communication stations, respectively. Indicated to be positioned within a first selected area, the first time slot and the second time slot being allocated based, at least in part, on the indication that the first and the at least second remote communication station are positioned within the first selected area. The first time slot differing from the second time slot;

a beamformer operable responsive to allocations made by said allocator, said beamformer for forming antenna beam patterns by which to permit transmission of the first and the at least second communication signals, respectively, upon the at least two successive time slots to the first and the at least second remote communication stations;

wherein the antenna beam patterns formed by said beamformer during the two successive time slots at least partially overlap during at least a portion of the two successive time slots;

wherein the transmitting station comprises a radio base station of a cellular communication system, the remote communication stations comprise mobile terminals, and wherein said allocator allocates a first mobile terminal to receive the first communication signal during the first time slot of the at least two successive time slots and allocates at least a second mobile terminal to receive the at least second communication signal during the second time slot of the at least two successive time slots; and wherein the mobile terminals include receiver circuitry having equalizers, wherein the second communication signal transmitted during the second time slot includes training sequences as portions thereof, and wherein the first mobile terminal utilizes the training sequences of the second communication signal transmitted during the second time slot to facilitate equalization of the first communication signal transmitted to the first mobile terminal during the first time slot.

17. Directional-beam generative apparatus for a radio transmitter operable pursuant to a TDMA (time division multiple access) communication scheme in which bursts of communication signals are transmitted during time slots defined upon a plurality of carriers, time slot-carrier combinations defining channels, to a plurality of remote communication stations, groups of time slots formatted into frames, said apparatus comprising:

a channel allocator coupled to receive indications of locations at which the plurality of remote communication stations are positioned, said channel allocator for allocating channels upon which to transmit the bursts of communication signals to allocated ones of the plurality of remote communication stations, allocation of the channels by said allocator responsive to the indications of the locations of the plurality of remote communication stations, such that communication signals to be transmitted to remote communication stations indicated to be within a selected area are allocated to channels formed of time slots defined upon a single carrier during at least a selected frame, each remote communication station of the remote communication stations indicated to be within the selected area being allocated to different channels formed by differing time slots;

a beamformer selectively coupled to receive the communication signals to be transmitted to the remote communication stations and coupled to receive indications of the allocations made by said channel allocator, said beamformer for forming directional antenna beam patterns by which to permit transmission of the communication signals upon the channels allocated by said allocator to the allocated ones of the plurality of remote communication stations;

wherein said allocator allocates at least a first channel formed of a time slot defined upon the single carrier upon which to communicate a first communication signal to a first remote communication station and a second channel formed of a time slot adjacent to the time slot forming the first channel, the second channel for communicating a second communication signal to a second remote communication station; and wherein first and second beam patterns of the beam patterns formed by said beamformer to permit the communication of the first and second communication signals, respectively, are formed for time periods that are greater than any time period defined by either of the time slots forming the first channel and the time slot adjacent thereto and forming the second channel.

18. In a method for transmitting communication signals at a transmitting station in bursts to remote communication stations upon a plurality of time slots defined upon at least a first carrier, an improvement of a method for forming antenna beam patterns during at least two successive time slots defined upon the at least the first carrier, said method comprising the steps of:

- detecting indications of locations at which the remote communication stations are positioned;
- allocating a first remote communication station to which to transmit a first communication signal upon a first time slot of the at least two successive time slots and at least a second remote communication station to transmit at least a second communication signal during at least a second time slot of the at least two successive time slots based, at least in part, on detection, during said step of detecting, of indications of positioning of the first and the second communication stations, respectively, within a first selected area, the first time slot differing from the second time slot;
- forming a first antenna beam pattern to transmit the first communication signal upon the first time slot to the first remote communication station;
- forming a second antenna beam pattern to transmit the at least second communication signal upon the at least second time slot to the at least second remote communication station; and
- forming another antenna beam pattern to transmit at least a portion of the at least second communication signal upon only a portion of the at least second time slot to the first remote communication station.

19. Directional-beam generative apparatus for a radio transmitter operable pursuant to a TDMA (time division multiple access) communication scheme in which bursts of communication signals are transmitted during time slots defined upon a plurality of carriers, time slot-carrier combinations defining channels, to a plurality of remote communication stations, groups of time slots formatted into frames, said apparatus comprising:

- a channel allocator coupled to receive indications of locations at which the plurality of remote communication stations are positioned, said channel allocator for allocating channels upon which to transmit the bursts of communication signals to allocated ones of the plurality of remote communication stations, allocation of the channels by said allocator responsive to the indications of the locations of the plurality of remote communication stations. Such that communication signals to be transmitted to remote communication stations indicated to be within a selected area are allocated to channels formed of time slots defined upon a single carrier during at least a selected frame, each remote communication station of the remote communication stations indicated to be within the selected area being allocated to different channels formed by differing time slots;
- a beamformer selectively coupled to receive the communication signals to be transmitted to the remote communication stations and coupled to receive indications of the allocations made by said channel allocator, said beamformer for forming directional antenna beam patterns by which to permit transmission of the communication signals upon the channels allocated by said allocator to the allocated ones of the plurality of remote communication stations;
- wherein said allocator allocates at least a first channel formed of a time slot defined upon the single carrier upon which to communicate a first communication signal to a first remote communication station and a second channel formed of a time slot adjacent to the time slot forming the first channel, the second channel for communicating a second communication signal to a second remote communication station; and
- wherein said beamformer forms a first antenna beam pattern at a first power level during the time slot forming the first channel and at a second, reduced power level during the time slot forming the second channel, and forms a second antenna beam pattern at a third power level during the time slot forming the second channel and at a fourth, reduced power level during the time slot forming the first channel.

* * * * *